(12) United States Patent
Fulcher et al.

(10) Patent No.: US 8,743,151 B1
(45) Date of Patent: Jun. 3, 2014

(54) SNAPPING MESSAGE HEADER

(75) Inventors: Richard Fulcher, Sunnyvale, CA (US); Attila Bodis, San Jose, CA (US); Simon Arscott, San Francisco, CA (US)

(73) Assignee: Google Inc., Mountain View, CA (US)

( * ) Notice: Subject to any disclaimer, the term of this patent is extended or adjusted under 35 U.S.C. 154(b) by 501 days.

(21) Appl. No.: 13/077,890

(22) Filed: Mar. 31, 2011

(51) Int. Cl.
G09G 5/00 (2006.01)

(52) U.S. Cl.
USPC .......................................... 345/684

(58) Field of Classification Search
None
See application file for complete search history.

(56) References Cited

U.S. PATENT DOCUMENTS

| | | | |
|---|---|---|---|
| 6,507,349 B1 * | 1/2003 | Balassanian | 345/676 |
| 6,839,411 B1 * | 1/2005 | Saltanov et al. | 379/88.13 |
| 8,489,146 B2 * | 7/2013 | Burns et al. | 455/566 |
| 2005/0234850 A1 * | 10/2005 | Buchheit et al. | 707/1 |
| 2007/0214002 A1 * | 9/2007 | Smith et al. | 705/2 |
| 2008/0168173 A1 * | 7/2008 | Munje et al. | 709/228 |
| 2009/0210778 A1 * | 8/2009 | Kulas et al. | 715/201 |
| 2011/0035681 A1 * | 2/2011 | Mandel et al. | 715/752 |
| 2011/0214088 A1 * | 9/2011 | Sandru | 715/785 |
| 2012/0079033 A1 * | 3/2012 | Vuong | 709/206 |

* cited by examiner

Primary Examiner — Ryan R Yang
(74) Attorney, Agent, or Firm — Troutman Sanders LLP; James E. Schutz; Christopher W. Glass

(57) ABSTRACT

Methods, systems, and computer-program products for displaying a message header on a client device are provided. An exemplary method for displaying a message header on a client device includes receiving a message on an electronic device and identifying a message header associated with the message. The exemplary method also includes, on a display of the electronic device, displaying a snapped header at a given location and at, least a portion of the message header when any portion of the message is also shown on the display. The exemplary method further includes changing a position of the message on the display while maintaining the display of the snapped header at the given location.

20 Claims, 15 Drawing Sheets

Planning for our trip to South America

Inbox   Friends   Travel

User A
usera@google.com
To: User B
Show details
14 Sep
10:42 am

User B,

So it looks like I will be able to take 6 months off work, so we now have the go-ahead on the trip!

What do you think about this list of countries to visit?

- Argentina
- Bolivia
- Brazil
- Chile
- Columbia?
- Ecuador
- Guyana?
- Peru
- Venezuela Archive   ∨   ∧   Delete 804
808

User A
usera@google.com

What do you think about this list of countries to visit?

- Argentina
- Bolivia
- Brazil
- Chile
- Columbia?
- Ecuador
- Guyana?
- Peru
- Venezuela If we can make it to the Galápagos, that would be great, but I am not sure it will fit into the budget. The same goes for the South Georgia and South Sandwich Islands.

Do you still have all your equipment from you previous travels? I need to buy a new backpack, as my current one is a little beat-up. What one do you have?

I cannot wait for this trip!

Archive   ∨   ∧   Delete

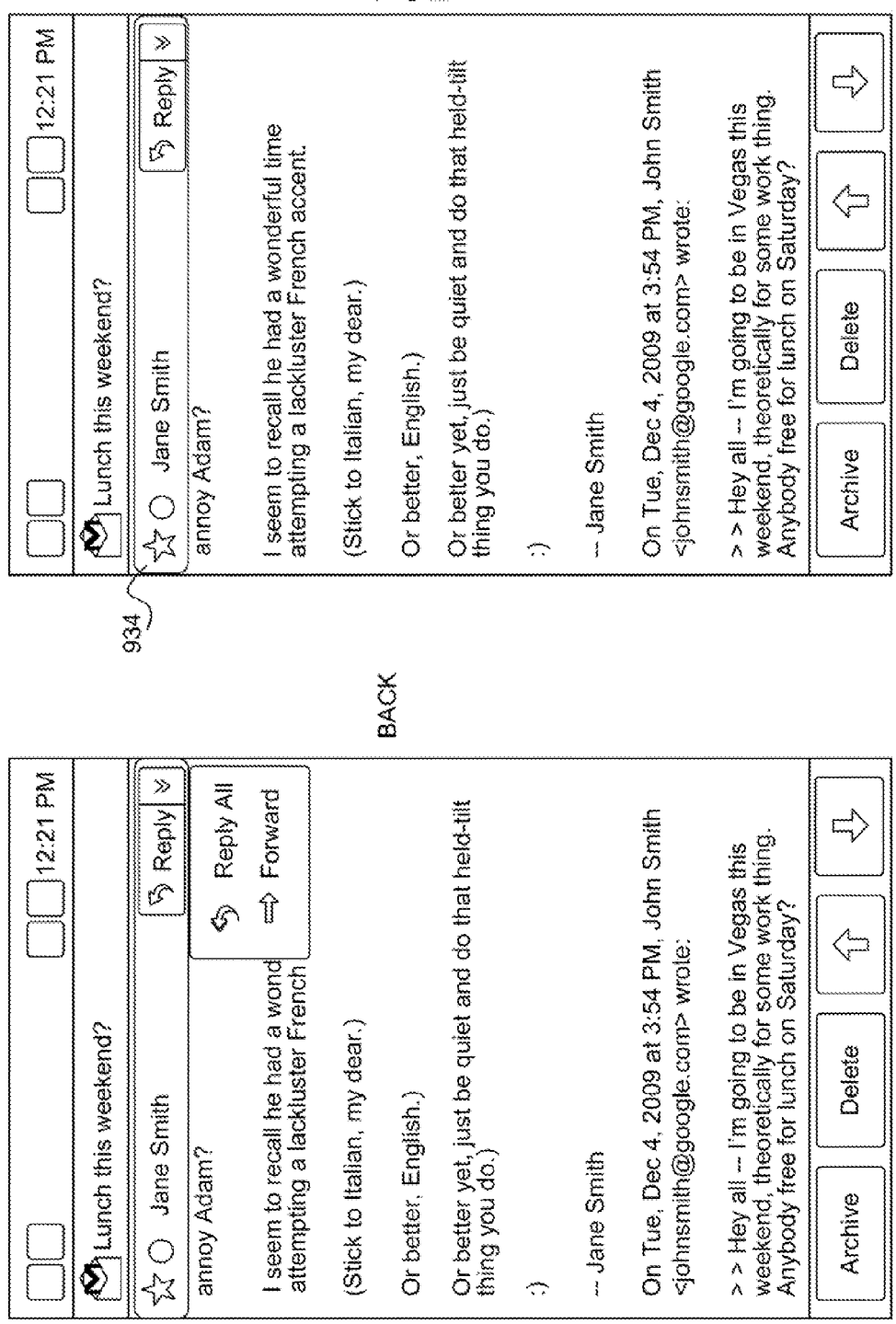

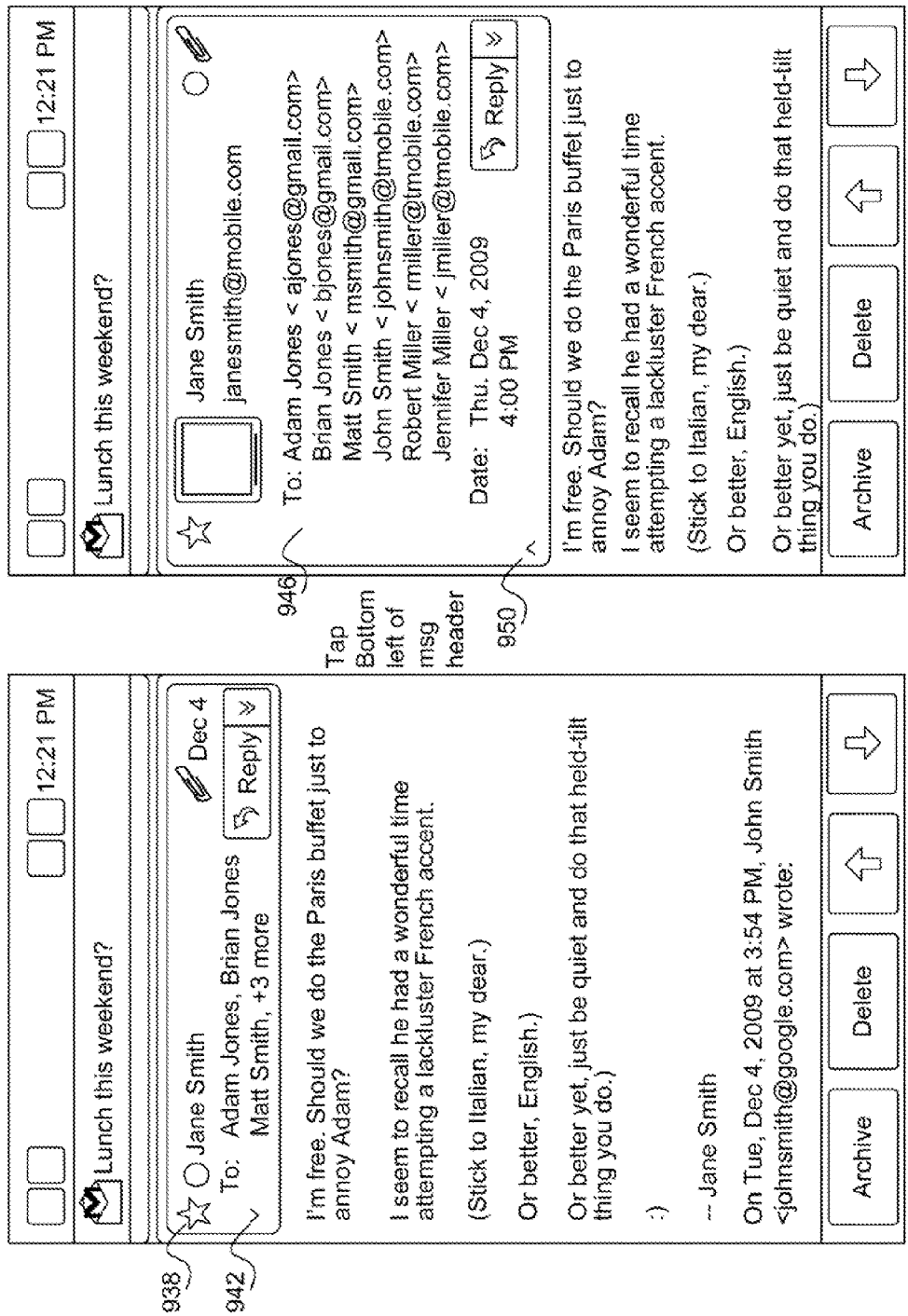

SNAPPING MESSAGE HEADER

BACKGROUND

1. Field of the Specification

This specification generally relates to message headers.

2. Background Art

Display systems play a prominent role in the design of many electronic devices. For example, notebook computers, personal digital assistants (PDAs), satellite navigation devices, electronic book readers, and mobile phones each provide a display device for presenting content to a user. A user may receive a message associated with a header. Typically when a user scrolls the message, the header may scroll off the display of a device.

BRIEF SUMMARY OF THE INVENTION

Embodiments relate to displaying a message header on a client device (e.g., mobile device, thin client). According to an embodiment, a method for displaying a message header on a client device includes receiving a message on an electronic device and identifying a message header associated with the message. The method also includes on a display of the electronic device, displaying a snapped header at a given location and at least a portion of the message header when any portion of the message is also shown on the display. The method further includes changing a position of the message on the display while maintaining the display of the snapped header at the given location.

According to another embodiment, a system for displaying a message header on a client device includes a receiver for receiving a message on an electronic device and a header identifier for identifying a message header associated with the message. The system also includes a display for displaying a snapped header at a given location and at least a portion of the message header when any portion of the message is also shown on the display. The system further includes an input device for changing a position of the message on the display while maintaining the display of the snapped header at the given location.

Further features and advantages of embodiments described herein, as well as the structure and operation of various embodiments, are described in detail below with reference to the accompanying drawings. It is noted that the embodiments described below are not limited to the specific embodiments described herein. Such embodiments are presented herein for illustrative purposes only. Additional embodiments will be apparent to persons skilled in the relevant art based on the teachings contained herein.

BRIEF DESCRIPTION OF THE DRAWINGS

FIG. 8 shows an exemplary initial header and exemplary snapped header that includes a portion of a scrollable message, according to an embodiment.

FIGS. 9A-9I show exemplary headers and snapped headers, according to an embodiment.

DETAILED DESCRIPTION OF THE INVENTION

Embodiments provide systems and methods for displaying a message header on a client device. The following detailed description refers to the accompanying drawings that illustrate exemplary embodiments. Other embodiments are possible, and modifications can be made to the embodiments within the spirit and scope of the detailed description.

It would be apparent to one of skill in the relevant art that the embodiments, as described below, can be implemented in many different embodiments of software, hardware, firmware, and/or the entities illustrated in the figures. Any actual software code with the specialized control of hardware to implement embodiments is not limiting of the detailed description. Thus, the operational behavior of embodiments will be described with the understanding that modifications and variations of the embodiments are possible, given the level of detail presented herein.

Figure 1:
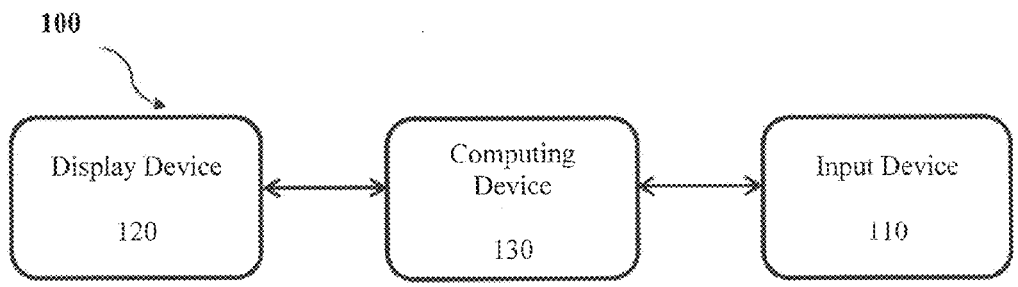
FIG. 1 shows an exemplary computer system in which embodiments described herein can be implemented.

FIG. 1 shows an exemplary computer system 100 in which embodiments described herein can be implemented. Computer system 100 can be, for example and without limitation, a personal computer system (e.g., desktop, laptop, tablet, and handheld computers), a personal digital assistant, a mobile device, a consumer electronic device, and other similar types of electronic devices. Computer system 100 includes an input device 110, a display device 120, and a computing device 130.

In an embodiment, computing device 130 is configured to execute instructions and to carry out operations associated with computer system 100. Computing device 130 can control the reception and manipulation of input and output data from input device 110 and display device 120, according to an embodiment. In an embodiment, computing device 130 can be implemented on a single computing device such as, for example and without limitation, a stand-alone device. Examples of computing device 130 include, but are not limited to, a central processing unit, an application-specific integrated circuit, and other types of computing devices that have at least one processor and memory. In another embodiment, computing device 130 can have multiple processors and multiple shared or separate memory components such as, for example and without limitation, one or more computing devices incorporated in a clustered computing environment or a server farm. The computing process performed by the clustered computing environment, or server farm, may be carried out across multiple processors located at the same or different locations.

In reference to FIG. 1, display device 120 is operatively coupled to computing device 130. Display device 120 can be, for example and without limitation, a liquid crystal display, a plasma display, a computer monitor (e.g., a variable graphics array (VGA) display, a super VGA display, and a cathode ray tube display), and other similar types of display devices. In an embodiment, display device 120 can be configured to display a graphical user interface (GUI) that provides an interface between a user and computer system 100 or an application running on computer system 100 (also referred to herein as a "system application"). The system application can be, for example and without limitation, an email application or a video game. Features of the GUI for the system application can be arranged in a predefined layout on display device 120 or can be, generated dynamically to serve specific actions taken by the user, according to an embodiment. For instance, the GUI can display information such as interactive text and graphics for the user to select via input device 110.

Display device 120 can display a variety of content. For example, display device 120 can display content such as content associated with e-mail messages, documents, and text messages. E-mail messages typically include a header and a body of text. A header may include information associated with the message such as control information, sender information (e.g., sender's name, sender's e-mail address, and sender's image), attachment icons that represent attachments, a subject field, and a date/time stamp.

Input device 110 is also operatively coupled to computing device 130. In an embodiment, the user can make a selection on the GUI for the system application via input device 110. Input device 110 can include a touch sensing device configured to receive an, input from a user's touch or a touch gesture from an external touch device (e.g., stylus device) and send the touch information to computing device 130, according to an embodiment. In turn, computing device 130 executes an operation associated with the touch information. The touch sensing device can be, for example and without limitation, a capacitive sensing device, a resistive sensing device, a surface acoustic wave sensing device, a pressure sensing device, an optical sensing device, and other similar types of sensing devices. In one embodiment, input device 110 can be presence sensitive and not require a touch, in addition to or instead of being a touch sensitive device.

In an embodiment, input device 110 can include a touch screen device integrated with a display device 120. The touch screen device can be integrated with display device 120, or it may be a separate component device from display device 120, according to an embodiment. In positioning the touch screen device over or in front of display device 120, the user can manipulate the GUI for the system application via one or more touch gesture (e.g., finger gestures or an external touch device) applied to input device 110. For instance, the user can press a button displayed by the GUI or drag an object in the system application from one end to another end of display device 120 using finger gestures or an external touch device.

Input device 110, display device 120, and computing device 130 of computer system 100 are shown in FIG. 1 as separate units, operatively coupled together. Two or more of the devices of computer system 100 may be provided in an integrated unit. For example, input device 110, display device 120, and computing device 130 can all be part of a smart phone, with the smart phone including an on-board processor serving as the processor for computing device 130 and a flat-screen display with an overlaying touch screen serving as display device 120 and input devices 110.

Electronic devices can receive messages such as e-mail messages. When a user selects a message, a display of the electronic device may display a header and body associated with the message. The header information is typically located at a top of the body of the message. The user can perform acts such as replying to a sender of the message, replying to all recipients including the sender of the message, forwarding the message to an e-mail address, or marking it (e.g., flagging it as very important) by making a selection in the header. When a message does not fit on a display of the electronic device, the user cannot see the whole message on the display. To view other portions of the message, the user can for example drag her finger in a direction on the display to see another portion of the message. In an example, when the user drags her finger up the display, the message may scroll up so that the user can see the bottom of the message.

The header information may typically be located at one place on the display of the electronic device (e.g., a top or a bottom of a message). The user would scroll to the top or bottom of the message to perform a function indicated in the header, for example, to reply to the message. When a body of the message scrolls up, the header information may also scroll up along with the body of the message and may no longer be visible to a user. To perform acts such as those described above (e.g., replying to the message or viewing header information associated with the message), the user scrolls back to the top of the message so that the header information is displayed on the electronic device. Once the header is displayed, the user can reply to the sender.

Embodiments provide a snapped header for a message. In an embodiment, a message is received on an electronic device. The message includes an initial message header associated with the message. When a position of the message is changed, instead of moving with the message (e.g., off a display screen of the electronic device), a header associated with the message stays or snaps at a given location on the display such that it remains visible. The snapped header may be the initial message header or another header that includes more or less information than the initial message header.

A snapped header can stay or snap into place at a given location on the display. When the message is scrolled and parts of the message are no longer visible on the screen, the user may continue to see a header associated with the message.

On a display of the electronic device, a snapped header at a given location is displayed and at least a portion of the message header is displayed when any portion of the message is also shown on the display. A position of the message on the display can be changed while maintaining the display of the snapped header at the given location.

In an embodiment, at least a portion of a header can be snapped into a given location on a display of the electronic device. The snapped header can be prevented from being scrolled off the display along with the message, and can remain visible on the display while a user scrolls the message. The snapped header can also provide an interactive user interface associated with the message. For example, the user can view the sender of the message, identifiably mark the message, or reply to the message while the message is displayed without scrolling to a beginning or end of the message. The snapped header can be replaced by the initial message header when the message is at its original position.

In one embodiment, the snapped header can be replaced with at least a portion of a second snapped header associated with a second message. This can happen for example if a conversation includes multiple messages. Suppose a conversation includes two messages. A first header associated with the first message may be displayed. When a user scrolls up and the message moves up, the first header can snap into place while the first message is displayed. When a user scrolls up to see a second message (e.g., a reply to the first message), a second header associated with the message may also be displayed. As the second message nears a top of the display, the second header can replace the first header and snap into place.

Figure 2:
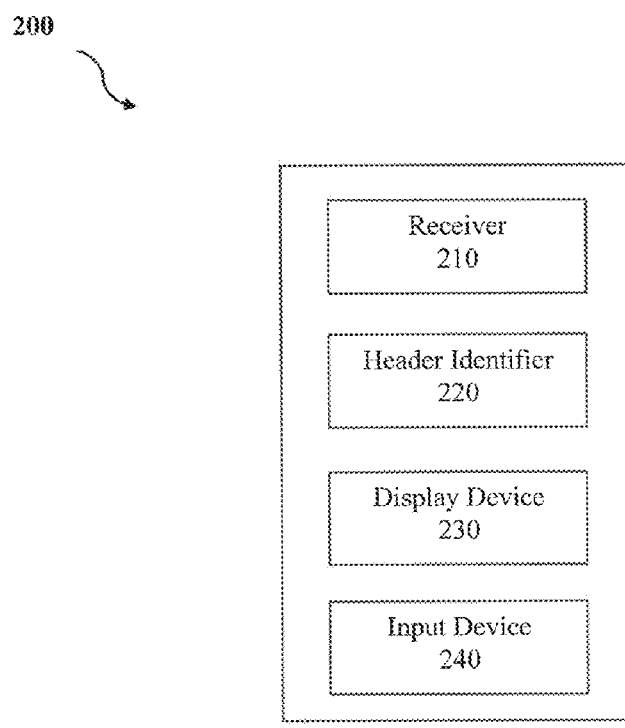
FIG. 2 shows a block diagram showing functions implemented by an exemplary system, according to an embodiment.

FIG. 2 shows a block diagram showing functions implemented by an exemplary system 200, according to an embodiment. Exemplary system 200 includes a receiver 210, header identifier 220, display device 230, and input device 240. Portions of header display system 200 may be included in one or more components of computer system 100. For example, receiver 210 and header identifier 220 may be included in computing device 130 of computer system 100.

Receiver 210 may receive a message such as an e-mail message or text message on an electronic device, according to an embodiment. The message can be received over a network (e.g., from a server) or stored in a database at the electronic device. A message can be associated with a header and a body. The header can have field names and values associated with the field names.

Header identifier 220 identifies a message header associated with the message, according to an embodiment. Header identifier may parse the message to identify the header information. Display device 230 displays content, according to an embodiment. The content can for example include messages from an e-mail message. other text, images, etc. Input device 240 can accept input that changes a position of the message on display device 230. For example, the message can be moved up, down, left, or right. Input device 240 can be input devices such as a touch screen, trackball, touchpad, wheel, or slider.

Note that in alternative embodiments, any subset of the components shown in FIG. 2 may in fact be embodied as a single component. For example, the functionality of receiver 210 and header identifier 220 may be combined in a single device or module. Other combinations of the functional components of FIG. 2 are also possible, as would be known to a person of skill in the art.

Further, alternative embodiments may have more or less than the components shown in FIG. 2. For example, in an embodiment, system 200 also includes a header expander for expanding a snapped header. The snapped header can be expanded in response to a selected portion of the snapped header. In another embodiment, system 200 also includes a header converter for converting a snapped header to a first scrollable header responsive to a proximity of at least one of a beginning or an end of the message associated with the snapped header. The first scrollable header on the display can be replaced with at least a portion of a second scrollable header associated with a second message (more details below).

Components in system 200 can be implemented in software, firmware, hardware, or a combination thereof. For example, embodiments of header identifier 220 can also be implemented as computer-readable code executed on one or more computing devices capable of carrying out the functionality described herein.

Figure 3A:
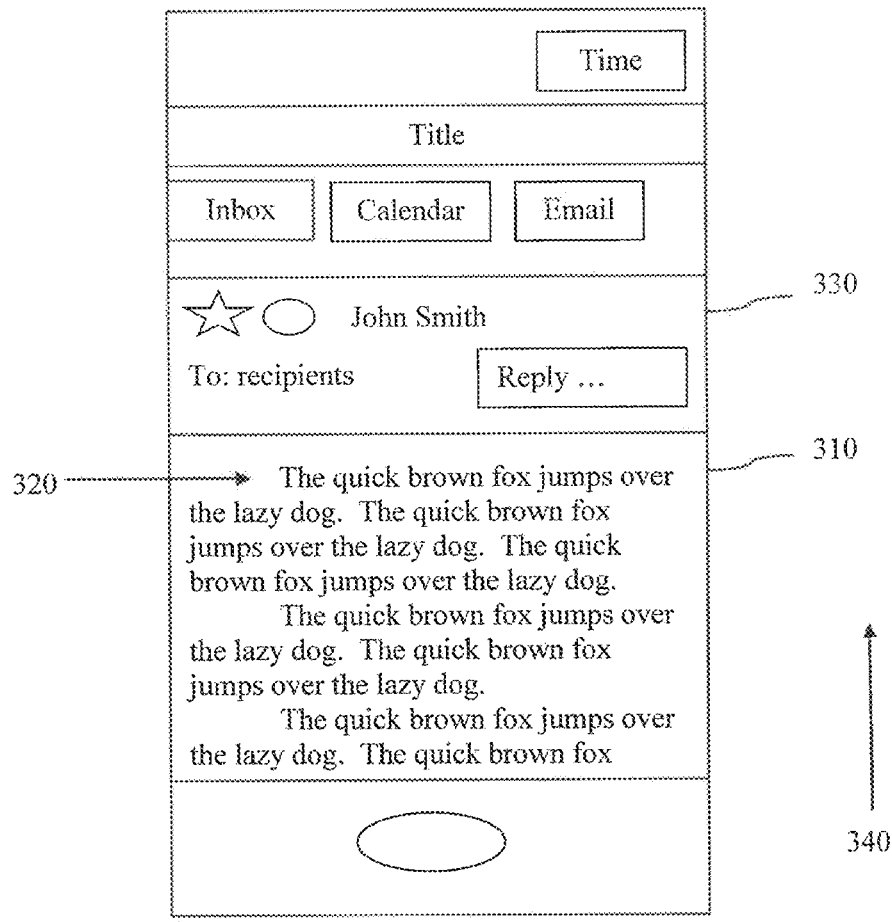
FIG. 3A shows an electronic device that includes an exemplary header, according to an embodiment.
Figure 3B:
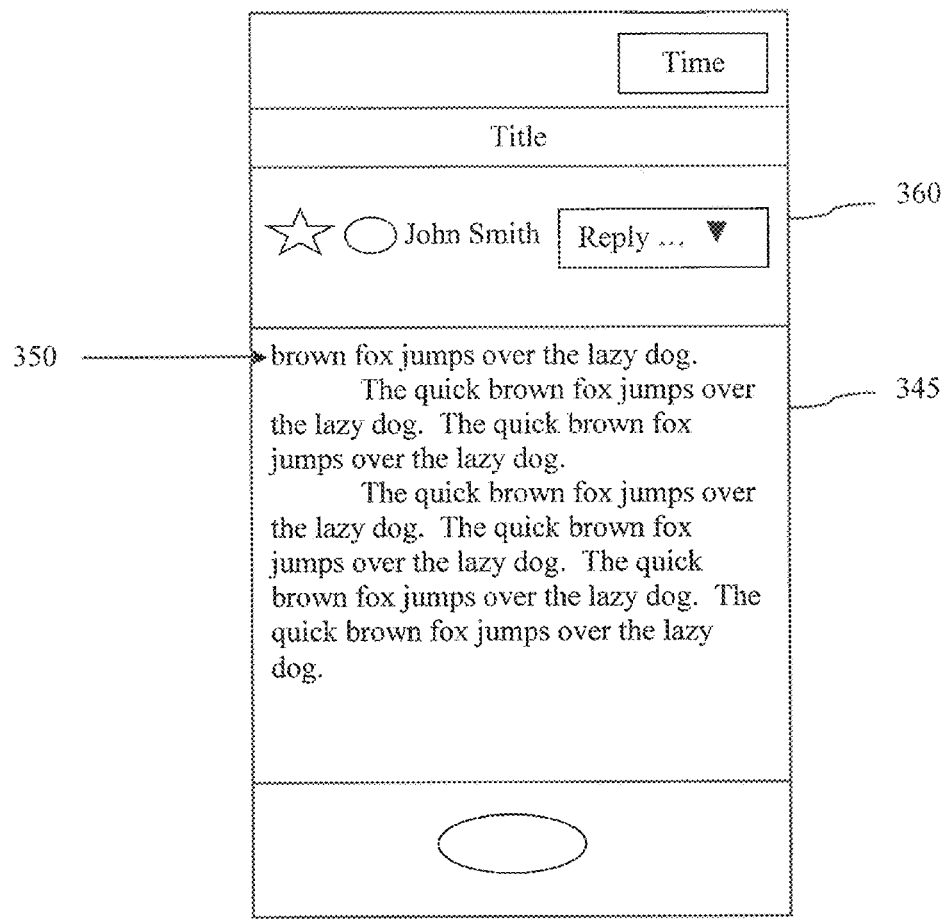
FIG. 3B shows an electronic device that includes an exemplary snapped header, according to an embodiment.

FIG. 3A shows an electronic device that includes an exemplary header, according to an embodiment. FIG. 3B shows an electronic device that includes an exemplary snapped header, according to an embodiment. In FIG. 3A, a display device 310 displays a message at a first position 320 and an initial header 330 associated with the message. Header 330 includes message information such as recipients of the message and a sender of the message. Header 330 also includes interactive features such as accepting input to allow a user to star the message or reply to the message by clicking a reply button. Display device 310 can accept input to change the position of the message such that the message is displayed at a position different from position 320. For example, a user can drag her finger up the screen in a direction 340 to scroll the message up. A user may wish to scroll a message to see other parts of the message that were not visible when the message was displayed at position 320. When a user scrolls up, different portions of the message may become visible. A header associated with the message will remain visible to the user. In an embodiment, a position of the message can be changed on the display while maintaining the display of a snapped header at the given location. A header stays or snaps in to the top of the screen, according to an embodiment. A message can be scrolled in different directions (e.g., vertically, horizontally, and diagonally).

In FIG. 3B, a display device 345 displays a message at a second position 350 and a snapped header 360 associated with the message. The second position shown in FIG. 3B is different from the first position shown in FIG. 3A. In an embodiment, display device 345 displays a snapped header 360 at a given location and at least a portion of the message header when any portion of the message is also shown on the display. As the position of the message changes (e.g., a user scrolls up within a long message),
a header associated with the message does not scroll off a top of the screen, according to an embodiment.

A snapped header can shrink in form from the initial message header, according to an embodiment. This may be because a header associated with a message that initially appears may show more information than a snapped header associated with the message. The snapped header may also show the same information as the initial header, according to an embodiment. This may depend on a user's preference.

A snapped header may also include functionality that allows a user to mark a message (e.g., star a message), reply to a message, or forward a message wherever the user is within the message. In an embodiment, snapped header 360 includes interactive features such as starring the message or clicking a reply button. Other features are also possible, as would be known to a person of skill in the art. An advantage of an embodiment may provide a user with easy access to those options without having to scroll to locate them. Snapped header 360 may also include other information. For example, snapped header 360 may provide a user with information such as the sender of the message wherever the user is within the message.

Figure 4:
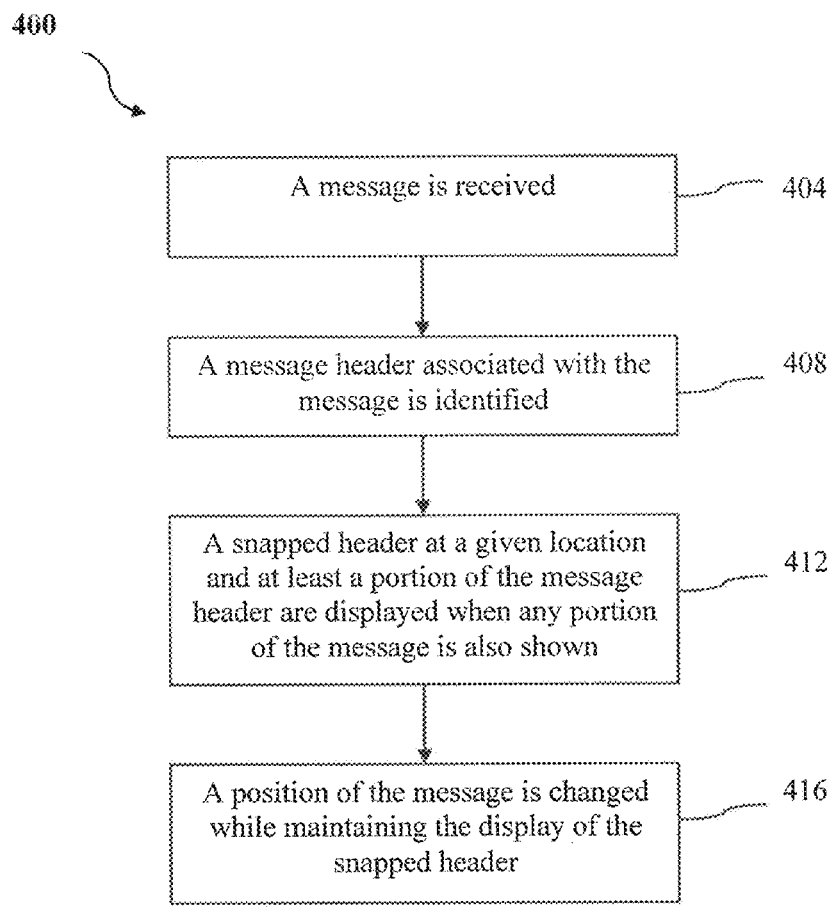
FIG. 4 shows a flowchart illustrating a method for displaying a message header on a client device, according to an embodiment.

FIG. 4 shows a flowchart illustrating a method 400 for displaying a message header on a client device, according to an embodiment. For ease of explanation, method 400 will be described in the context of a mobile phone. Based on the description herein, a person of ordinary skill in the relevant art will recognize that method 400 can be executed on other types of devices such as, for example and without limitation, a PDA, a tablet, and a laptop. These other types of devices are within the scope and spirit of the embodiments described herein.

While method 400 is described with respect to an embodiment, method 400 is not meant to be limiting and may be used in other applications. In an example, method 400 may be used to display a message header on a mobile device, like in systems 100 or 200 of FIG. 1 or 2. However, method 400 is not meant to be limited to systems 100 or 200. At step 404, a message is received. In some embodiments, receiver 210 may perform this act. At step 408, a message header associated with the message is identified. In some embodiments, header identifier 220 may perform this act. At step 412, a snapped header at a given location and at least a portion of the message header are displayed when any portion of the message is also shown. At step 416, a position of the message is changed while maintaining the display of the snapped header.

Operations for the above-described embodiments may be further described with reference to one or more logic flows. It may be appreciated that the representative logic flows do not necessarily have to be executed in the order presented, or in any particular order, unless otherwise indicated. Moreover, various activities described with respect to the logic flows can be executed in serial or parallel fashion. The logic flows may be implemented using one or more hardware elements and/or software elements of the described embodiments or alternative elements as desired for a given set of design and performance constraints. For example, the logic flows may be implemented as logic (e.g., computer program instructions) for execution by a logic device (e.g., a general-purpose or specific-purpose computer).

Figure 5A:
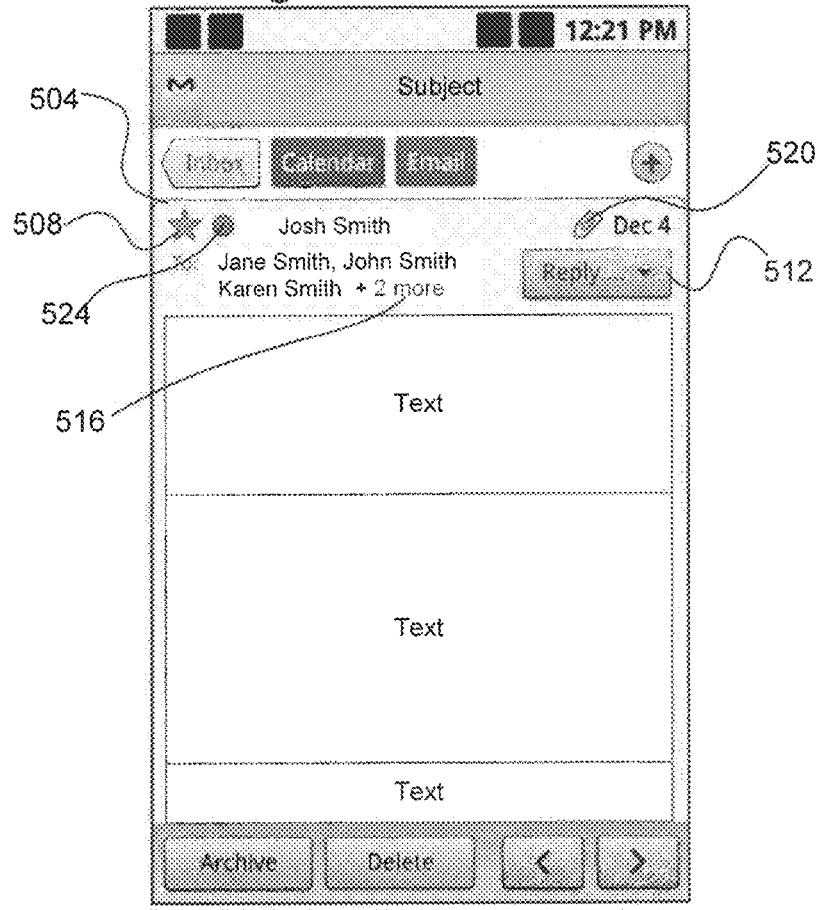
FIG. 5A shows an exemplary header of an electronic device, according to an embodiment.

FIG. 5A shows an exemplary header 504 of an electronic device, according to an embodiment. FIG. 5A shows controls available in header 504, according to an embodiment. The header may display a name of the user (e.g., Josh Smith). Further, a user may mark a message by tapping on an identifier 508 or reply to a sender of the message by tapping on a selector 512. When a list of recipients are listed in the "To" field, a shorter version of the list can be seen. A link 516 shows that 2 more recipients received the message. The user may see the rest of the recipient list by tapping on link 516. Further, an attachment icon 520 indicates to the user that an attachment was sent with the message. The user may view the attachment by tapping on attachment icon 520. The electronic device may also allow the user to communicate over a network by receiving and sending messages or changing a talk status of an instant messaging application. The user may communicate with another user by tapping on a chat button 524. The buttons and links described above are not limited to the buttons and links shown in FIG. 5A. For example, button 510 can be a shape different from a star (e.g., circle, trapezoid, etc.). Further, the buttons and links can be displayed as other objects in other embodiments.

Figure 5B:
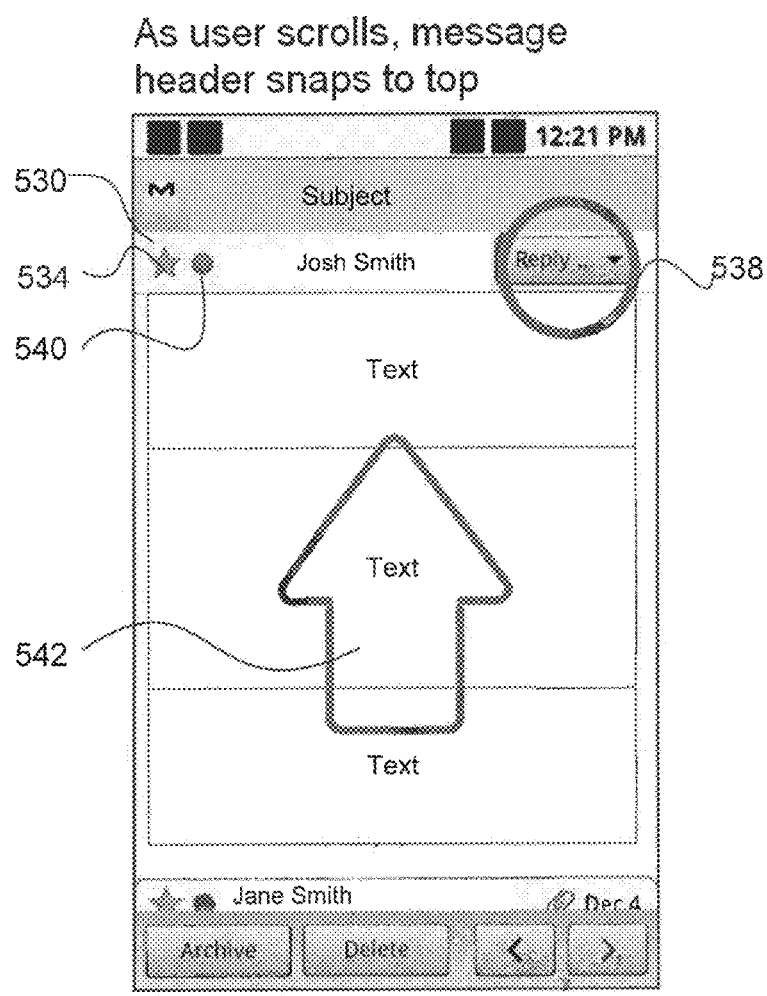
FIG. 5B shows an exemplary snapped header of an electronic device, according to an embodiment.

FIG. 5B shows an exemplary snapped header 530 of an electronic device, according to an embodiment. Snapped header 530 includes information such as a sender name associated with a sender of the message (e.g., Josh Smith). In some embodiments, snapped header can contain more or less information than that shown in FIG. 5B. For example, in some embodiments, a snapped header can contain a contact image associated with the sender name or an attachment icon representing attachments associated with the message. As the message is scrolled in a direction 542, snapped header 530 remains visible on the display. In an embodiment, as the user scrolls the message, snapped header 530 snaps to a location of the display and remains at the location while portions of the message are displayed. The snapped header can snap or remain at any location of the display (e.g., top, bottom, and side of the display).

Snapped header 530 may also include a user interface associated with the message. The user interface may include an identifier 534 to selectively mark the message, a selector 538 to reply to the sender or other options, and a chat button 540 to communicate with another user. In some embodiments, the user interface may be expanded. For example, snapped header may include a user interface that includes a selector to expand the user interface. For example, selector 538 can be expanded to show other options available to a user. In FIG. 5B, selector 538 is shown by a downward-pointing arrow.

Figure 5C:
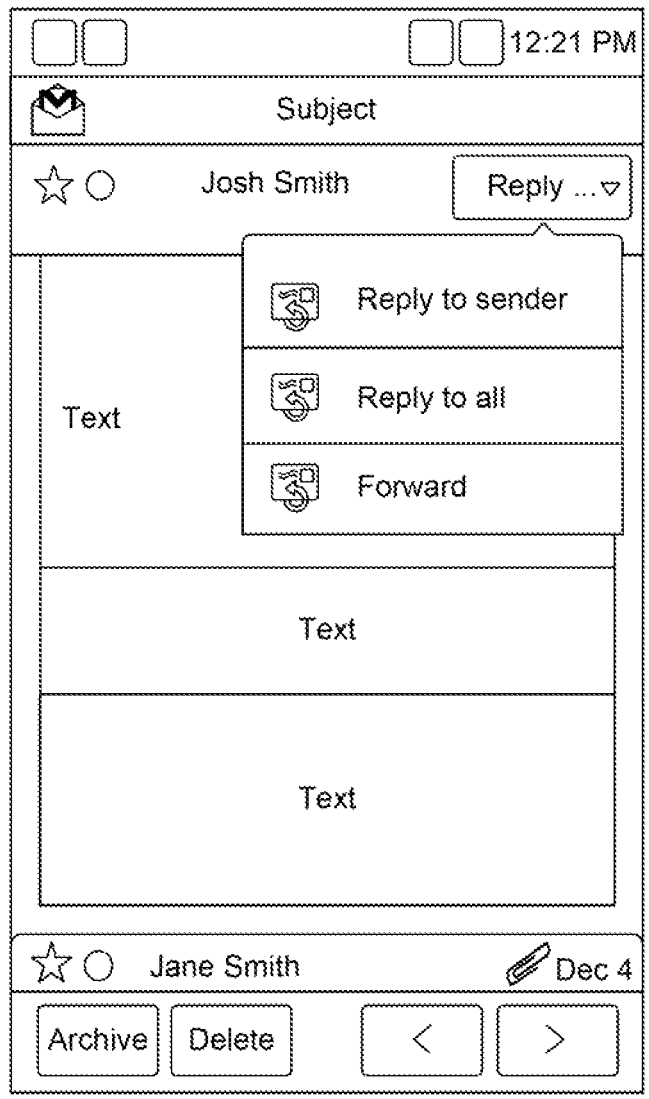
FIG. 5C shows an exemplary snapped header that includes an expanded user interface, according to an embodiment.

FIG. 5C shows an exemplary snapped header that includes an expanded user interface, according to an embodiment. The expanded user interface can include expandable controls that include a selector to reply to the sender of the message, a selector to reply to all senders and recipients associated with the message, a selector to forward the message, and a selector to collapse the expanded user interface. Other selectors or options are known to a person of ordinary skill in the relevant art.

In an embodiment, snapped header 530 in FIG. 5B can be expanded in response to a user selecting a portion of snapped header 538. The selected portion can be a sender name associated with the sender of the message. Further, a position of the message on the display can change based on the expanded snapped header. In an embodiment, an input device can change the position of the message on the display based on the expanded snapped header.

In an embodiment, snapped header 530 shrinks in form compared with header 504 and snaps to a top of the display below the title bar. In other embodiments, snapped header 530 may be above or beside the title bar. This preference may be set by a user, according to an embodiment. In some embodiments, the title bar may be absent and not displayed.

Figure 6:
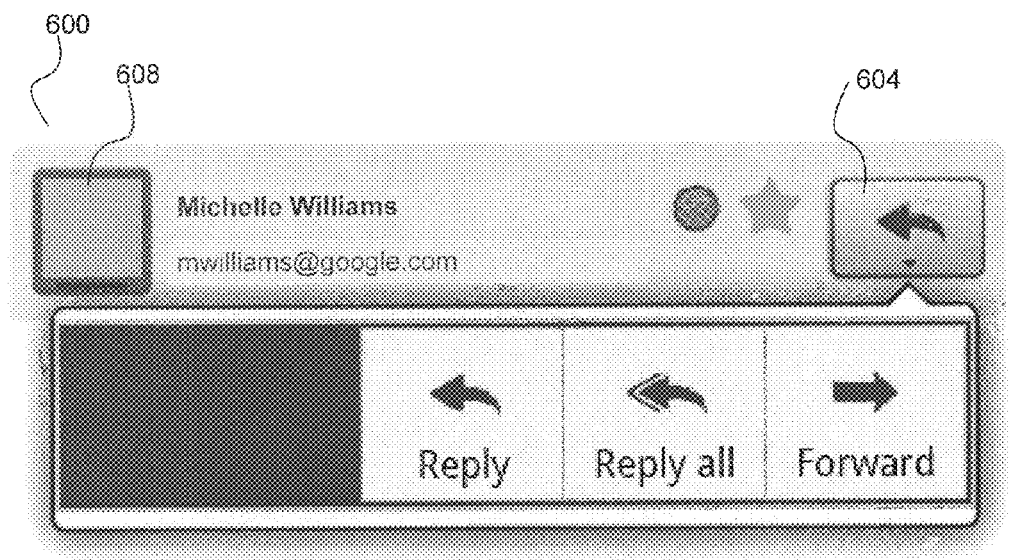
FIG. 6 shows an exemplary snapped header that includes an expandable user interface, according to an embodiment.

FIG. 6 shows an exemplary snapped header 600 that includes an expandable user interface, according to an embodiment. A selector 604 can expand the user interface and collapse the expanded user interface. When a user selects selector 604 (e.g., touching near or on a surface of selector 604), selector 604 can expand to show other options or selections for a user. For example, the expanded user interface includes a selector to reply to the sender associated with the message, a selector to reply to all senders and recipients associated with the message, and a selector to forward the message. A user can collapse the expanded user interface by selecting selector 604 again. FIG. 6 also shows among other things an image 608 associated with a sender of the image.

Figure 7A:
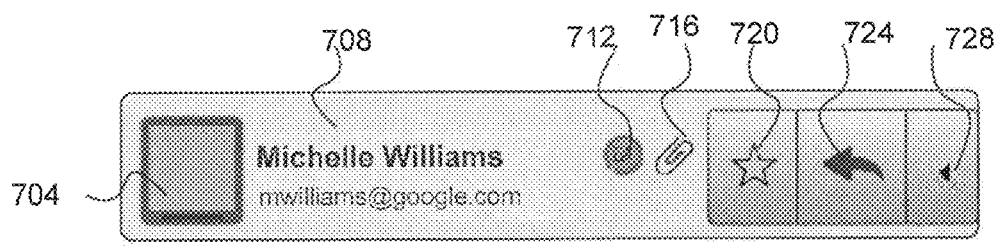
FIGS. 7A-7B show exemplary snapped headers that include expandable user interfaces, according to embodiments.
Figure 7B:
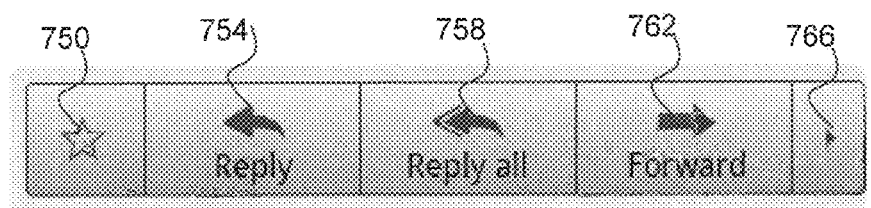

In some embodiments, snapped headers may contain more or less than the components described. Further, a symbol of a selector may be different from that shown in the figures. For example, FIGS. 7A-7B show exemplary snapped headers that include expandable user interfaces, according to embodiments. FIG. 7A shows a snapped header that includes an image 704 associated with a sender of the message, a name and e-mail address of the sender 708, a chat button 712, and an attachment icon 716. The snapped header also includes a ribbon that includes an identifier 720, a selector 724 to reply to a sender of the message, and a selector 728 to expand the user interface. In other embodiments, the ribbon may include other components.

Based on a user's preferences, certain controls and information can be displayed to the user by default. In an embodiment. identifier 720 and selector 724 to reply to a sender of the message are displayed by default. To the right of identifier 720 and selector 724 is selector 728, which is shown in FIG. 7A as a left-pointing arrow that expands the ribbon from left to right. In an embodiment, if a user touches selector 728, identifier 720 and selector 724 are pushed to the left and more options are displayed for a user to select from. When the user interface is expanded, a user can select additional options (e.g., reply to all senders and recipients associated with the message). Additionally, when the user interface is expanded, a shape of selector 728 can change to indicate to a user that the user interface is expanded (e.g., changing from a triangle pointing to a left of the display to a triangle pointing to a right of the display). Other changes to selector 728 are also possible.

In FIG. 7B, the expanded user interface includes a ribbon that includes an identifier 750, a selector 754 to reply to a sender of the message, a selector 758 to reply to all senders and recipients associated with the message, a selector 762 to forward the message, and a selector 766 to collapse the expanded user interface. Selector 766 may be a right-pointing arrow that collapses the ribbon. In an embodiment, if a user touches selector 766, the additional controls that displayed as a result of touching selector 728 in FIG. 7A for example are collapsed and no longer visible to a user. An advantage of an embodiment of the ribbon may provide for more space in viewing a message. For example, instead of expanding the user interface vertically (e.g., upward or downward), the user interface spans across a header and does not block message content.

The controls displayed by default may be configured depending on a user's preferences. In an embodiment, the user interface includes at least one selector associated with an action whose default setting can be configured. For example, in FIG. 7A, a user may be able to set a default to display a selector that replies to all (e.g., replies to the sender and recipients of the message) instead of a selector that replies only to the sender. In this example if the user interface were not expanded, to reply to only a sender of the message, the user would access this reply option through selector 728 (e.g., the left-pointing arrow) and choose this option in the expanded user interface of the display.

FIG. 8 shows an exemplary initial header and exemplary snapped header that includes a portion of a scrollable message, according to an embodiment. In FIG. 8, a recipient, User A, receives a message from a sender, User B. The message includes a header 804 and body 808 portions. The recipient can view other portions of the message by scrolling the message. When the recipient scrolls the message up, a position of the message on the display changes and a header associated with the message snaps in place, according to an embodiment. Header 812 shows a snapped header when the position of the message on the display changes, according to an embodiment. When the position of the message on the display changes, the display of snapped header 812 is maintained while the user views the message.

A conversation may consist of a collection of messages. For example, an e-mail string may consist of user A sending a message to user B. User B may then send a response to the message to user A. When user A receives the response, user A may decide to reply to user B's message. In an embodiment, as a user scrolls down a conversation associated with different messages, a header area of each message snaps to a top of the screen. This may provide a user with instant information regarding the message (e.g., the sender, date and time sent, etc.)

Figures 9A, 9B:
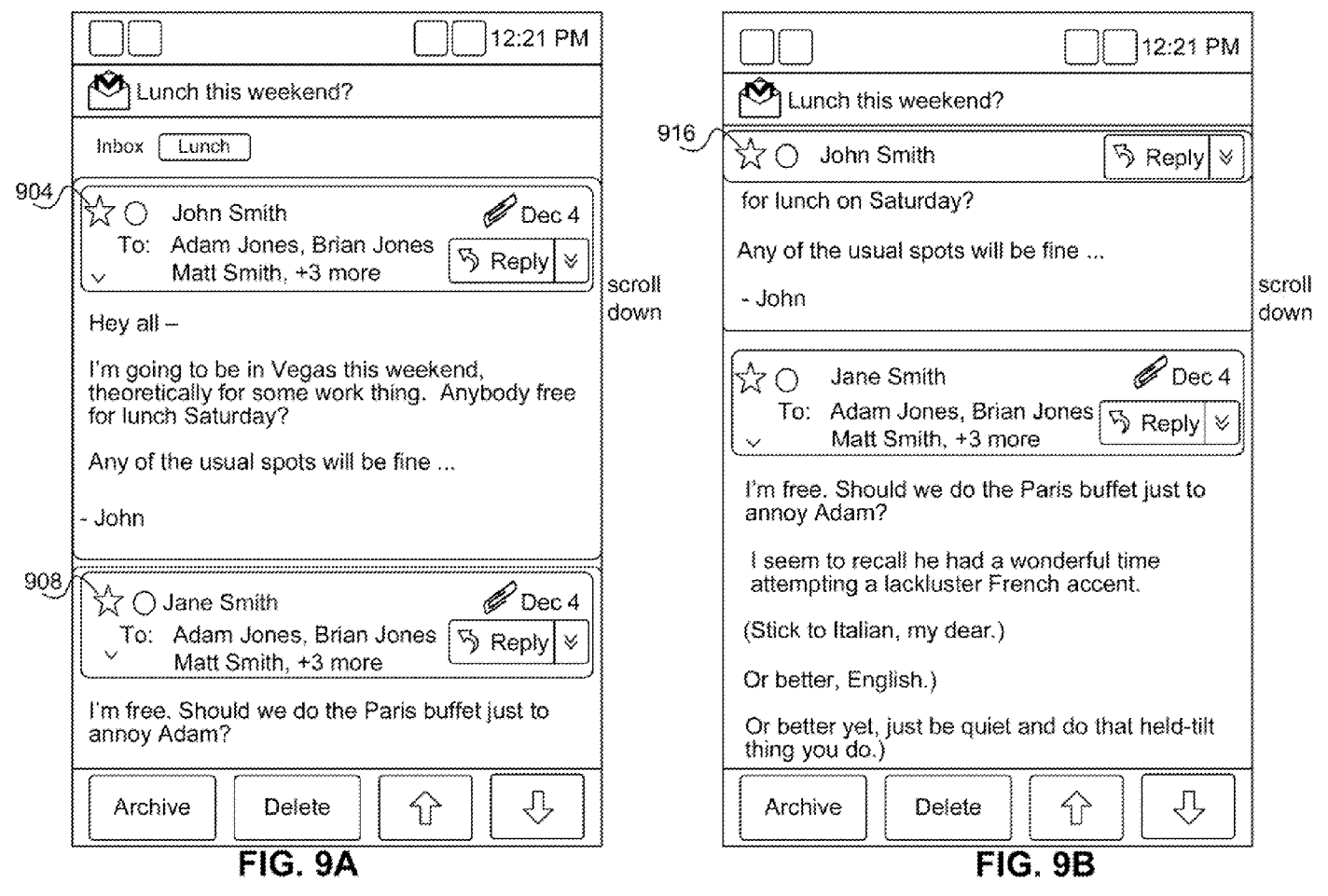
Figure 9D:
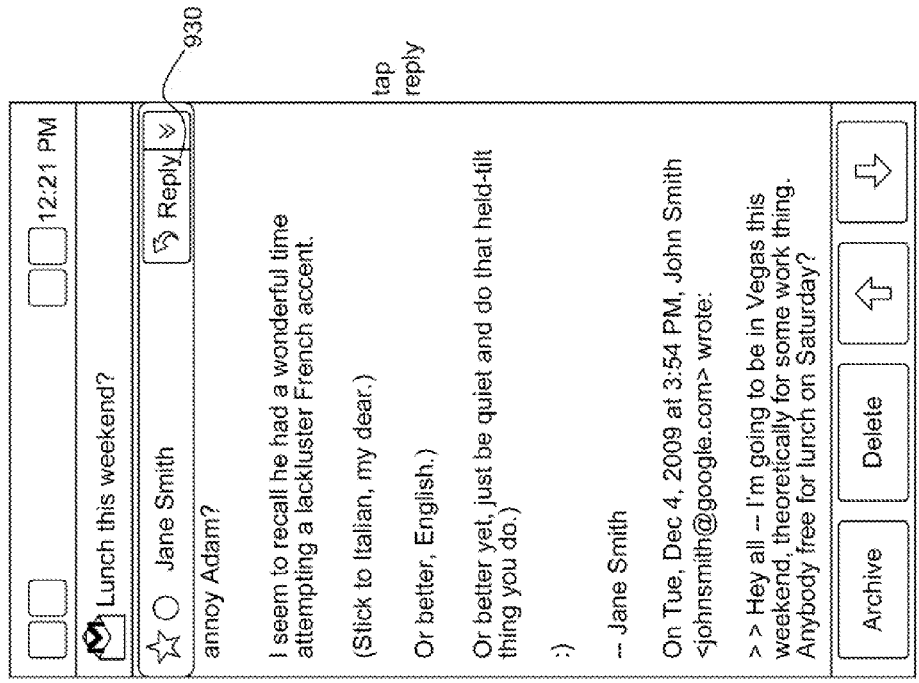

FIGS. 9A-9I show exemplary headers and snapped headers, according to an embodiment. FIG. 9A shows a message thread having at least two messages, according to an embodiment. The first message is shown as sent from John Smith. The message from John Smith is associated with a header 904. The header includes information such as a sender and recipients associated with the first message. A portion of a second message from Jane Smith can be seen near a bottom of the display. The second message from Jane Smith is associated with a header 908. A user can scroll the message up to see the rest of the message from Jane Smith. As a user scrolls up, the first message from John Smith changes position on the display.

In an embodiment, as a message is at a position near a top of the screen, the header associated with the message transforms into a snapped header. The displayed snapped header may depend on the underlying message the snapped header is associated with. In an embodiment, header 904 associated with the first message is pushed away and header 908 associated with the second message replaces header 904. Header 908 slides in to take the place of header 904, according to an embodiment.

Figure 9C:
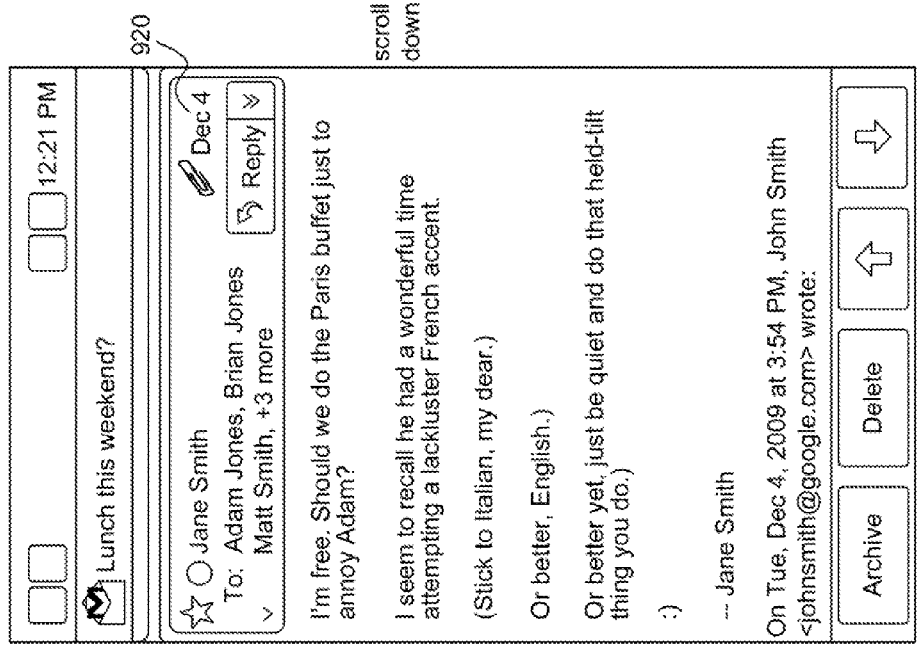

FIG. 9B shows an exemplary snapped header 916 that is associated with the first message from John Smith near the top of the display, according to an embodiment. FIG. 9C shows a header 920 associated with the second message from Jane Smith near the top of the display, according to an embodiment. When the second message sent from Jane Smith is near the top of the display, the header associated with the second message is snapped into a location and is displayed. When a user scrolls down and the first message becomes visible, header 930 associated with the second message may be replaced with another header. In an embodiment, header 930 is replaced with header 920. Header 904 is no longer visible on a display of FIG. 9C. In another embodiment, header 930 is replaced with header 916 when the first message from John Smith can be viewed.

FIG. 9D shows a reply button 930 associated with a snapped header, according to an embodiment. To reply to the message, it may be unnecessary for the user to scroll to a top or bottom of the message. The user may tap a reply button 930 to reply to the message. In an embodiment, reply button 930 may be a selector to expand the user interface.

FIG. 9E shows an exemplary expanded user interface that includes a reply all option and a forward option, according to an embodiment. A user can select any of these options.

A user can also tap on the snapped header to view more information associated with the message, according to an embodiment. FIG. 9F shows an exemplary snapped header 934 that includes a user interface, according to an embodiment. A user can tap on snapped header 934 to view more information associated with the message. FIG. 9G shows an exemplary header 938 that may display as a result of tapping header 934 in FIG. 9F, according to an embodiment. Header 938 includes information such as other recipients of the message and an attachment icon. Header 938 also includes a selector 942 that may be selected to display more information associated with the message.

FIG. 9H shows a header 946 that may display as a result of tapping selector 942 in FIG. 9G, according to an embodiment. Header 946 includes information such as e-mail addresses of the other recipients that received the message, an image associated with the sender of the message, and a date and time the message was sent. Header 946 also includes a selector 950 that may be selected to display less information in header 946.

In an embodiment, a smaller form of the header is layered at a top of the display so it may obscure portions of the message. As the user continues to scroll down, the message can be pushed up. As a bottom edge of the message starts to come closer to a bottom edge of the snapped header, the snapped header pushes off with the bottom edge and a header associated the next message slides in and replaces the snapped header.

Figure 9I:
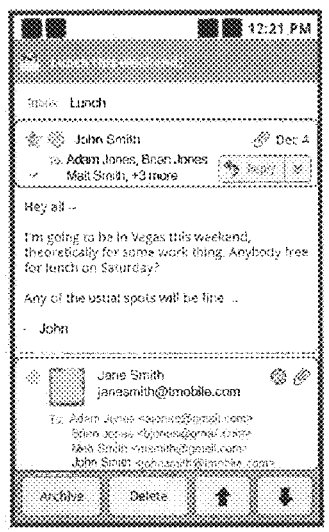

In an embodiment, to see a top of the message thread (e.g., first message), a user can tap on the conversation title in the header. FIG. 9I shows a display that may result from tapping the conversation title in the header in FIG. 9H, according to an embodiment.

In an embodiment, a snapped header is converted to a first scrollable header responsive to a proximity of at least one of a beginning or an end of the message associated with the snapped header. The first scrollable header on the display is replaced with at least a portion of a second scrollable header associated with a second message.

Figure 10:
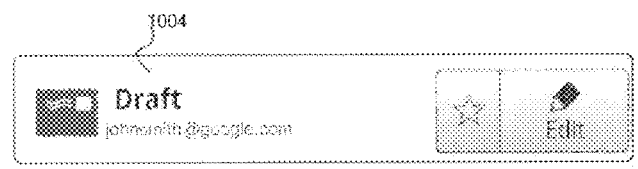
FIG. 10 shows an exemplary snapped header associated with a draft message, according to an embodiment.

FIG. 10 shows an exemplary snapped header 1004 associated with a draft message, according to an embodiment.

Snapped header 1004 includes a user interface associated with the draft message. The user interface can include an identifier to selectively mark the message, a selector to edit the draft message, or other identifier or selector.

In another embodiment, when the electronic device is in a landscape orientation, the snapped header changes to a landscape orientation. When the electronic device is in a portrait orientation, the snapped header changes to a portrait orientation In another embodiment, based on a user's preference, the electronic device can be configured to always display snapped headers, only display snapped headers when a particular condition is satisfied (e.g., the electronic device is in a portrait orientation, electronic device is in a landscape orientation, or a message thread contains at least two messages), or to never display snapped headers (e.g., turn off the feature). This may be implemented using the user interface, according to an embodiment.

In another embodiment, a snapped sidebar, a snapped footer, a snapped header, or a combination thereof, is displayed on the electronic device. The snapped sidebar, footer, or header remains visible to a user wherever the user is in a message. For example, in an embodiment, a display displays both a snapped header and a snapped footer. As a user scrolls a message, the snapped header and a snapped footer remain visible to a user such that the user can see information regarding the message wherever the user is within the message.

Embodiments may be implemented in hardware, software, firmware, or a combination thereof, Embodiments may be implemented via a set of programs running in parallel on multiple machines.

The summary and abstract sections may set forth one or more but not all exemplary embodiments of the present invention as contemplated by the inventor(s), and thus, are not intended to limit the present invention and the appended claims in any way.

Embodiments of the present invention have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments.

Exemplary embodiments of the present invention have been presented. The invention is not limited to these examples. These examples are presented herein for purposes of illustration, and not limitation. Alternatives (including equivalents, extensions, variations, deviations, etc., of those described herein) will be apparent to persons skilled in the relevant art(s) based on the teachings contained herein. Such alternatives fall within the scope and spirit of the invention.

What is claimed is:

1. A computer-implemented method, comprising:
receiving, at a computing device, a first message including message content and header information associated with the first message;
outputting, by the computing device, for display at a predetermined location of a display device, a snapped header including at least a portion of the header information associated with the first message;
responsive to receiving, at the computing device, an indication to scroll the message content of the first message, scrolling, by the computing device, the message content of the first message while maintaining the snapped header at the predetermined location of the display device;
responsive to determining, by the computing device, that at least a portion of the message content of the first message, as output for display on the display device, corresponds to a beginning or end of the first message, converting, by the computing device, the snapped header to a first scrollable header;
receiving, at the computing device, a second message and header information associated with the second message; and
outputting, by the computing device, for display on the display device, a second scrollable header including at least a portion of the header information associated with the second message such that, as displayed on the display device, the first scrollable header is replaced by the second scrollable header.

2. The method of claim 1, wherein the snapped header includes a user interface associated with the first message, the user interface including at least one of an identifier to selectively mark the first message, a selector to reply to a sender, and a selector to expand the user interface.

3. The method of claim 2, further comprising expanding, by the computing device, the user interface to form an expanded user interface, the expanded user interface including at least one of a selector to reply to all senders and recipients associated with the first message, a selector to forward the first message, and a selector to collapse the expanded user interface.

4. The method of claim 2, wherein the user interface includes at least one selector associated with an action, wherein a default setting associated with the action is selectively configurable.

5. The method of claim 1, wherein the snapped header includes at least one of a sender name associated with a sender of the first message, a contact image associated with the sender name, and an attachment icon representing attachments associated with the first message.

6. The method of claim 1, further comprising:
responsive to a selection of a portion of the snapped header, expanding, by the computing device, the snapped header; and
changing, by the computing device, a display position of associated with the first message, based on the expanded snapped header.

7. The method of claim 6, wherein the portion of the snapped header that is selected corresponds to a sender name associated with a sender of the first message.

8. The method of claim 1, wherein the predetermined location of the display device corresponds to a location that is below a title bar displayed toward a top location of the display device.

9. The method of claim 1, wherein the snapped header is associated with a draft message, and wherein the snapped header includes a user interface associated with the draft message, the user interface including at least one of an identifier to selectively mark the draft message and a selector to edit the draft message.

10. A system, comprising:
at least one processor;
a memory coupled to the at least one processor and storing instructions that, when executed by the at least one processor, cause the system to:
receive a first message including message content and header information associated with the first message;
output, for display at predetermined location of a display device, a snapped header including at least a portion of the header information associated with the first message;
responsive to receiving an indication to scroll the message content of the first message, scroll the message content of the first message while maintaining the snapped header at the predetermined location of the display device;
responsive to determining that at least a portion the message content associated with the first message, as output for display on the display device, corresponds to a beginning or end of the first message, convert the snapped header to a first scrollable header;
receive a second message and header information associated with the second message; and
output, for display on the display device, a second scrollable header including at least a portion of the header information associated with the second message such that, as displayed on the display device, the first scrollable header is replaced by the second scrollable header.

11. The system of claim 10, wherein the snapped header includes a user interface associated with the first message, the user interface including at least one of an identifier to selectively mark the message, a selector to reply to a sender, and a selector to expand the user interface.

12. The system of claim 11, wherein the memory stores instructions that, when executed by the at least one processor, further cause the system to expand the user interface to form an expanded user interface, the expanded user interface including at least one of a selector to reply to all senders and recipients associated with the first message, a selector to forward the first message, and a selector to collapse the expanded user interface.

13. The system of claim 11, wherein the user interface includes at least one selector associated with an action, and wherein a default setting associated with the action is selectively configurable.

14. The system of claim 10, wherein the snapped header includes at least one of a sender name associated with a sender of the first message, a contact image associated with the sender name, and an attachment icon representing attachments associated with the first message.

15. The system of claim 10, wherein the memory stores instructions that, when executed by the at least one processor, further cause the system to: responsive to a portion of the snapped header being selected, expand the snapped header to form an expanded snapped header;
responsive to receiving an input, based on the expanded snapped header, cause a change in position of the first message as displayed on the display device.

16. The system of claim 15, wherein the portion of the first message that is selected is a sender name associated with a sender of the first message.

17. The system of claim 10, wherein the predetermined location of the display device corresponds to a location that is below a title bar displayed toward a top location of the display device.

18. The system of claim 10, wherein the snapped header is associated with a draft message and the snapped header includes a user interface associated with the message, the user interface including at least one of an identifier to selectively mark the draft message and a selector to edit the draft message.

19. A method, comprising:
identifying, by a computing device, header information associated with a first message including message content;
outputting, by the computing device, for display at a predetermined location of a display device, a snapped header including at least a portion of the header information associated with the first message;
responsive to receiving, at the computing device, an indication to scroll the message content of the first message, scrolling, by the computing device, the message content of the first message while maintaining the snapped header at the predetermined location of the display device;
responsive to determining, by the computing device, that at least a portion of the message content associated with the first, as output for display on the display device, corresponds to a beginning or an end of the first message, converting, by the computing device, the snapped header to a first scrollable header;
identifying, by the computing device, header information associated with a second message; and
outputting, by the computing device, for display on the display device, a second scrollable header including at least a portion of the header information associated with the second message such that, as displayed on the display device, the first scrollable header is replaced by the second scrollable header.

20. A computer-program product comprising non-transitory computer-readable medium containing instructions that, when executed by at least one processor, cause a computing device to:
receive a first message including message content and header information associated with the first message;
output, for display at a predetermined location of a display device, a snapped header including at least a portion of the header information associated with the first message;
responsive to receiving an indication to scroll the message content of the first message, scroll the message content of the first message while maintaining the snapped header at the predetermined location of the display device;
responsive to determining that at least a portion of the message content of the first message, as output for display on the display device, corresponds to a beginning or end of the first message, convert the snapped header to a first scrollable header;
receive a second message and header information associated with the second message; and
output, for display on the display device, a second scrollable header including at least a portion of the header information associated with the second message such that, as displayed on the display device, the first scrollable header is replaced by the second scrollable header.

\* \* \* \* \*